US012736321B2

(12) United States Patent
Wang et al.

(10) Patent No.: US 12,736,321 B2
(45) Date of Patent: Sep. 15, 2026

(54) VERTICAL-HEIGHT GAUGE AND MEASURING METHOD

(71) Applicant: Anhui Agricultural University, Hefei (CN)

(72) Inventors: Xiaoyu Wang, Hefei (CN); Xiaole Wang, Hefei (CN); Chun Li, Hefei (CN)

(73) Assignee: Anhui Agricultural University, Hefei (CN)

(*) Notice: Subject to any disclaimer, the term of this patent is extended or adjusted under 35 U.S.C. 154(b) by 317 days.

(21) Appl. No.: 18/595,635

(22) Filed: Mar. 5, 2024

(65) Prior Publication Data

US 2024/0302154 A1 Sep. 12, 2024

(51) Int. Cl.
*G01B 5/06* (2006.01)
*G01C 15/10* (2006.01)

(52) U.S. Cl.
CPC ............. *G01B 5/061* (2013.01); *G01C 15/10* (2013.01)

(58) Field of Classification Search
CPC ......... G01B 5/061; G01B 5/063; G01B 5/065
USPC ........................................... 33/392, 464, 833
See application file for complete search history.

(56) References Cited

U.S. PATENT DOCUMENTS 3,051,425 A * 8/1962 Homrighausen ...... F16M 11/36 33/375
3,220,114 A * 11/1965 Mecone ................. G01B 5/061 33/838
3,224,103 A * 12/1965 Kiralfy .................. G01B 5/065 33/832
4,458,423 A * 7/1984 Sakata ..................... B25H 7/00 33/832
4,459,756 A * 7/1984 Patek ..................... G01B 5/061 33/833
4,498,241 A * 2/1985 Nakaoki .................. B25H 7/00 33/534
4,521,967 A * 6/1985 Uchino .................. G01B 5/061 33/832
4,993,164 A * 2/1991 Jacobsen .................. A47C 7/46 297/284.4
5,131,257 A * 7/1992 Mingardi ............. B25H 1/0007 72/457
6,073,359 A * 6/2000 Lee ...................... A61B 5/1072 33/DIG. 1
6,226,881 B1 * 5/2001 Landauer ............... G01B 5/061 33/511
6,802,135 B2 * 10/2004 Jordil ..................... G01B 5/061 33/832

(Continued)

*Primary Examiner* — George B Bennett

(57) ABSTRACT

Disclosed in the present disclosure are a vertical-height gauge and a measuring method, relating to the field of surveying and mapping tools, and including a measuring plate, a support fixing plate, a plumb, a steel tape and a plumb rope. The measuring plate includes a reference plate, an auxiliary reference plate and a reference ruler; the support fixing plate includes a fixing base plate, two racks are oppositely arranged on a side surface of the fixing base plate, a slide plate is arranged between the two racks, a first gear meshing with the single rack and rotating is arranged on two sides of the slide plate separately, a control assembly is arranged on the slide plate, and the control assembly is configured to control a rotating state of the first gears; and the reference plate is perpendicularly connected to the slide plate.

9 Claims, 8 Drawing Sheets

(56) References Cited

U.S. PATENT DOCUMENTS

| | | | | |
|---|---|---|---|---|
| 7,207,121 | B2 * | 4/2007 | Wixey | G01B 5/061 33/613 |
| 7,637,025 | B2 * | 12/2009 | Lee | G01B 5/061 33/783 |
| 8,375,592 | B1 * | 2/2013 | Holt | B43L 7/14 33/456 |
| 9,109,892 | B2 * | 8/2015 | Carbajal | G01C 15/10 |
| 9,389,056 | B2 * | 7/2016 | Wood | G01B 3/20 |
| 11,041,706 | B2 * | 6/2021 | Kimura | G01B 5/0002 |
| 11,262,176 | B2 * | 3/2022 | Wang | G01S 7/40 |
| 11,382,532 | B1 * | 7/2022 | Hajianpour | G01B 5/061 |
| 2006/0137204 | A1 * | 6/2006 | Yang | G01B 7/082 33/832 |
| 2022/0361771 | A1 * | 11/2022 | Guzman | G01B 3/08 |
| 2023/0324173 | A1 * | 10/2023 | Sergyeyenko | F16M 11/18 33/290 |
| 2024/0389816 | A1 * | 11/2024 | Li | A47L 1/02 |

* cited by examiner

VERTICAL-HEIGHT GAUGE AND MEASURING METHOD

TECHNICAL FIELD

The present disclosure belongs to the field of surveying and mapping tools, and in particular to a vertical-height gauge and a measuring method.

BACKGROUND

The description in this section merely provides background information relevant to the present disclosure in public and does not constitute the prior art.

As main instruments used in measurement, theodolites, total stations, and GPS typically cannot obtain accurate results like a leveling and level measurement in ground point elevation measurement, and the main reason is that heights of the theodolites, the total station, GPS base station antennas, prisms and beacons cannot be measured accurately. In order to use the theodolites, the total stations, and the GPS to measure ground point elevations accurately, the heights of the instruments, the prisms and the beacons must be accurately obtained.

Prior art such as an invention TOOL FOR MEASURING VERTICAL HEIGHT has an invention publication number U.S. Pat. No. 20220361771A1. Disclosed in the invention is a tool for measuring a vertical height. The tool includes a first elongated member with a measuring strip, a handle connected to the first elongated member, and a second elongated member connected to the first elongated member in a sliding manner. The second elongated member includes a measuring window configured to facilitate reading of the measuring strip, to indicate a length of the tool between an upper end of the first elongated member and a lower end of the second elongated member. When the tool is in a retracted position, the handle is disposed between the measuring window and the lower end of the second elongated member, and is configured to move the first elongated member relative to the second elongated member. The invention has low measurement accuracy.

It should be noted that the above description of the technical background is only for the convenience of clear and complete description of the technical solutions of the present application and for the convenience of understanding by those skilled in the art. The technical solutions described above should not be considered known to those skilled in the art merely because they are set forth in the background section of the present application.

SUMMARY

The present disclosure aims to provide a vertical-height gauge and measuring method which are simple and ingenious, high in measuring accuracy, easy to operate and adjust and suitable for various terrains.

In order to achieve the above objective, the present disclosure adopts following technical solutions.

A vertical-height gauge includes a measuring plate, a support fixing plate, a plumb, a steel tape and a plumb rope, where the measuring plate includes a reference plate, an auxiliary reference plate and a reference ruler;

the support fixing plate includes a fixing base plate, two racks are oppositely arranged on a side surface of the fixing base plate, a slide plate is arranged between the two racks, a first gear meshing with a single rack and rotating is arranged on two sides of the slide plate separately, a control assembly is arranged on the slide plate, and the control assembly is configured to control a rotating state of the first gears; and the slide plate is slidable in a length direction of the fixing base plate, and the reference plate is perpendicularly connected to the slide plate.

According to an embodiment of the present disclosure, an upper surface of the reference plate is provided with a circular level and a leveling tube, the reference plate and the auxiliary reference plate are connected by a built-in hinge at an end of the reference plate, the reference ruler is built in the auxiliary reference plate, the reference ruler has a trapezoidal cross section, reference ruler fixing screws are symmetrically arrange on two sides of the auxiliary reference plate, and the reference ruler fixing screws are configured to fix a position of the reference ruler.

According to an embodiment of the present disclosure, a measuring plate fixing sleeve sleeves an end of the reference plate close to the slide plate, a lifting micro-screw of the measuring plate is arranged on an upper wall of the measuring plate fixing sleeve, the lifting micro-screw is connected to a push pin, the push pin makes contact with the upper surface of the reference plate, two embedded springs are arranged in a lower wall of the measuring plate fixing sleeve and make contact with the reference plate; and the reference plate is perpendicularly connected to the slide plate through the measuring plate fixing sleeve.

According to a design of the entire device, the measuring plate includes the reference plate, the auxiliary reference plate and the reference ruler. The reference plate, the auxiliary reference plate and the reference ruler are independent of each other and combined together. The entire device is simple and compact, and convenient to carry. Before measurement, the entire instrument is assembled first. According to a height of a measurement point from the ground, in case that the measurement point is high than a bottom end of the support fixing plate, the measuring plate is placed in a horizontal position through a circular level (with a bubble in the middle), a bottom surface of an end of the measuring plate away from the support fixing plate is placed on the measurement point, the slide plate connected to the other end is fixed through the control assembly, the measuring plate lifting micro-screw is adjusted to make the measuring plate accurately horizontal, and a height is accurately measured by using the plumb and the steel tape. In case that the measurement point is lower than the bottom of the support fixing plate or the measurement point is lower than the ground surface (h≤25 cm), the auxiliary reference plate is used, the reference plate is rotated clockwise to a position perpendicular to the measuring plate by using the built-in hinge, one end of the auxiliary reference plate is placed on the measurement point, and the measuring plate fixing screw is adjusted to center the bubble of the circular level, such that the height is capable of being measured, and other operation steps are the same as that when the measurement point is higher than the bottom end of the support fixing plate. When the measurement point is lower than the ground surface (25 cm≤h≤50 cm), the reference ruler needs to be used; first, the auxiliary reference plate is screwed down, the reference ruler fixing screws are loosened, the reference ruler is pulled out to a suitable position, then the reference ruler fixing screw is screwed to fix the reference ruler, and other operation steps are the same as that when the measurement point is higher than the bottom end of the support fixing plate. The entire device is less influenced by external factors of a magnetic field and weather, and is capable of basically adapt to measurement for a measurement point under various conditions. The measurement is convenient and efficient, the accuracy is reliable, and an error is small. In case that center positions of horizontal axes of a theodolite and a total station, center positions of a prism and a beacon, a global position system (GPS) antenna position is capable of being provided accurately, measurement effects are better. Accuracy is capable of reaching 0.1 mm.

Through arrangement of the support fixing plate, the two first gears on the slide plate respectively mesh with the two racks oppositely arranged on a side surface of the fixing base plate, such that the slide plate is capable of being displaced in a horizontal direction of the fixing base plate. Through control over the rotation state of the first gears by the control assembly, a position of the slide plate on the fixing base plate is further adjusted. Since the reference plate is perpendicularly connected to the slide plate, the position of the reference plate is adjusted by controlling the slide plate. Through the above arrangement, in a process of adjusting the position of the slide plate, the slide plate is capable of being controlled to be fixed at any position along the fixing base plate. Moreover, by using the gears, damping feeling is improved to accurately control the position, and accuracy of the entire device is improved. Through perpendicular arrangement of the support fixing plate and the auxiliary reference plate, the device is capable of being applied to different terrains and effectively guarantee measurement accuracy. Moreover, through the perpendicular arrangement of the support fixing plate and the auxiliary reference plate, a shaking problem caused by single plate support is capable of being avoided or solved. Moreover, levelness feedback and adjustment efficiency of the reference plate is capable of being obviously improved after displacement of any plate.

Through arrangement of the measuring plate fixing sleeve, the lifting micro-screw is connected to the push pin, a certain gap is formed between the measuring plate fixing sleeve and the measuring plate, and the push pin is driven to move up and down through rotation of the lifting micro-screw, such that the measuring plate is finely adjusted, and the horizontal accuracy of the measuring plate is ensured. Two embedded springs are arranged in the lower wall of the measuring plate fixing sleeve and make contact with the reference plate. On one hand, a certain gap is capable of being kept between the measuring plate fixing sleeve and the measuring plate, more friction or scratch is capable of being prevented from being generated between the measuring plate fixing sleeve and the measuring plate, accuracy of the entire instrument in a use process are capable of being improved, and the adjustment of the measuring plate by the lifting micro-screw is facilitated. On the other hand, the springs are capable of effectively absorbing tiny vibration or impact generated by the measuring plate in a use process, and reduce an influence, such as small vibration caused by airflow flowing through the measuring plate, of a surrounding environment on measurement.

Further, the lower end of the support fixing plate is provided with a plurality of conical sharp corners. Providing the lower end of the support fixing plate with the plurality of conical sharp corners is beneficial to insertion of the support fixing plate into soil, and is capable of improving stability of the support fixing plate, reducing or preventing deviation of the support fixing plate caused by improper operation or external force factors in a measurement process, and improving accuracy of experimental data.

Further, the entire device material is made of stainless steel material. The use of stainless steel improves the service life of the entire device, and also prevents or reduces wear or loss of parts in a use process.

According to an embodiment of the present disclosure, the control assembly includes brake gears arranged corresponding to the first gear, the brake gear limits rotation of the first gears by meshing with the two first gears, the brake gear is connected to a switch assembly, the switch assembly is configured to rotate the brake gear around a rotation shaft of one first gear when the brake gear maintains a meshing state with the first gear, and to move the brake gear closer to or away from the other first gear; and the switch assembly is arranged on the slide plate.

The brake gear limits rotation of the first gears by meshing with the two first gears, that is, a self-locking state is formed. A brake effect of the slide plate is capable of being guaranteed by arranging the brake gear, and stability and accuracy of the entire device are improved. Moreover, the switch assembly is configured to rotate the brake gear around a rotation shaft of one first gear when the brake gear maintains a meshing state with the first gear, that is, the brake gear meshes with one first gear all the time. Moreover, the switch assembly is configured to rotate an axis of the brake gear around an axis of the first gear, such that the brake gear mores away from or close to the other first gear, thereby sliding or fixing the slide plate. Further, the arrangement of the brake gear improves rotation resistance of the first gear, and the resistance improves the accuracy of the first gear in a rotation process, such that the accuracy of the entire device is capable of being improved.

According to an embodiment of the present disclosure, the brake gear is identical to the first gear.

The brake gear is identical to the first gear, such that no matter what state the first gear is in, the switch assembly controls the brake gear to mesh with two adjacent first gears, that is, no matter what position of the fixing base plate the slide plate is in, braking of the slide plate is capable of being guaranteed.

According to an embodiment of the present disclosure, the slide plate is provided with a brake groove, the brake gear is slidably arranged in the brake groove, and the brake groove is configured to define a movement path of the brake gear.

The brake groove arranged on the slide plate guarantees that the brake gear moves according to a specified route, and also prevents the brake gear from being separated from a normal position, and stability of operation of the brake gear is capable of being guaranteed.

According to an embodiment of the present disclosure, the switch assembly includes a first rotating rod, an end of the first rotating rod is hinged to an end of a second rotating rod, the other end of the second rotating rod is hinged to an end of a third rotating rod, the other end of the third rotating rod is rotatably connected to the rotation shaft of the first gear, a gear shaft of the brake gear is rotatably connected to the third rotating rod;

- a first rotating shaft is perpendicularly arranged in the middle of the first rotating rod, and the first rotating shaft is configured to control the first rotating rod to rotate around the first rotating shaft; and
- a vertical slit is formed on the support fixing plate, and the first rotating shaft perpendicularly passes through the vertical slit.

Through arrangement of the switch assembly, rotation of the first rotating rod drives the third rotating rods at two ends to rotate in opposite directions around the rotation shafts of the first gears respectively connected through hinge between the first rotating rod, the second rotating rod and the third rotating rods. The rotation of the first rotating rod is driven through the first rotating shaft, and the first rotating shaft also perpendicularly passes through the vertical slit, such that an operator is capable of directly controlling the first rotating shaft to control the brake gear to get close to or separate from another first gear, that is, the first rotating shaft is controlled to control the slide plate. Through the arrangement of the switch assembly, the entire operation is simple and easy.

According to an embodiment of the present disclosure, a filling member is arranged at an end of the reference ruler fixing screw, the filling member is hollow, and a surface of the filling member is rough.

Through arrangement of the filling member, the filling member is made of a flexible substance, such that excessive friction or scratches between the reference ruler fixing screw and a side surface of the reference ruler is capable of being prevented, and problems such as sliding and blocking between the reference ruler and a base floating plate caused by scratches and burrs are capable of being avoided. Further, when the filling member is pressed, a surface area is capable of being increased, a friction force on the reference ruler is capable of being improved, and retraction of the reference ruler or other conditions are capable of being prevented.

The Present Disclosure Further Provides a Vertical-Height Measuring Method, Including:

S1: assembling a vertical-height gauge;

S2: keeping a measuring plate approximately horizontal, and fixing a position of a slide plate with the other hand through a control assembly;

S3: adjusting the measuring plate, and making the measuring plate horizontal accurately;

S4: fixing an end of a steel tape to a lower edge of the measuring plate, and putting the steel tape into any narrow groove of a plumb to tightly attach a plumb rope, so as to guarantee vertical measurement, or tightly attach the plumb rope for direct measurement;

S5: completing measurement according to S2-S4 in case that a measurement point is higher than a bottom end of the support fixing plate; and S6: in case that the measurement point is lower than the bottom end of the support fixing plate, screwing an auxiliary reference plate down according to the depth or pulling a reference ruler, and completing the measurement according to S2-S4.

Figure 1:
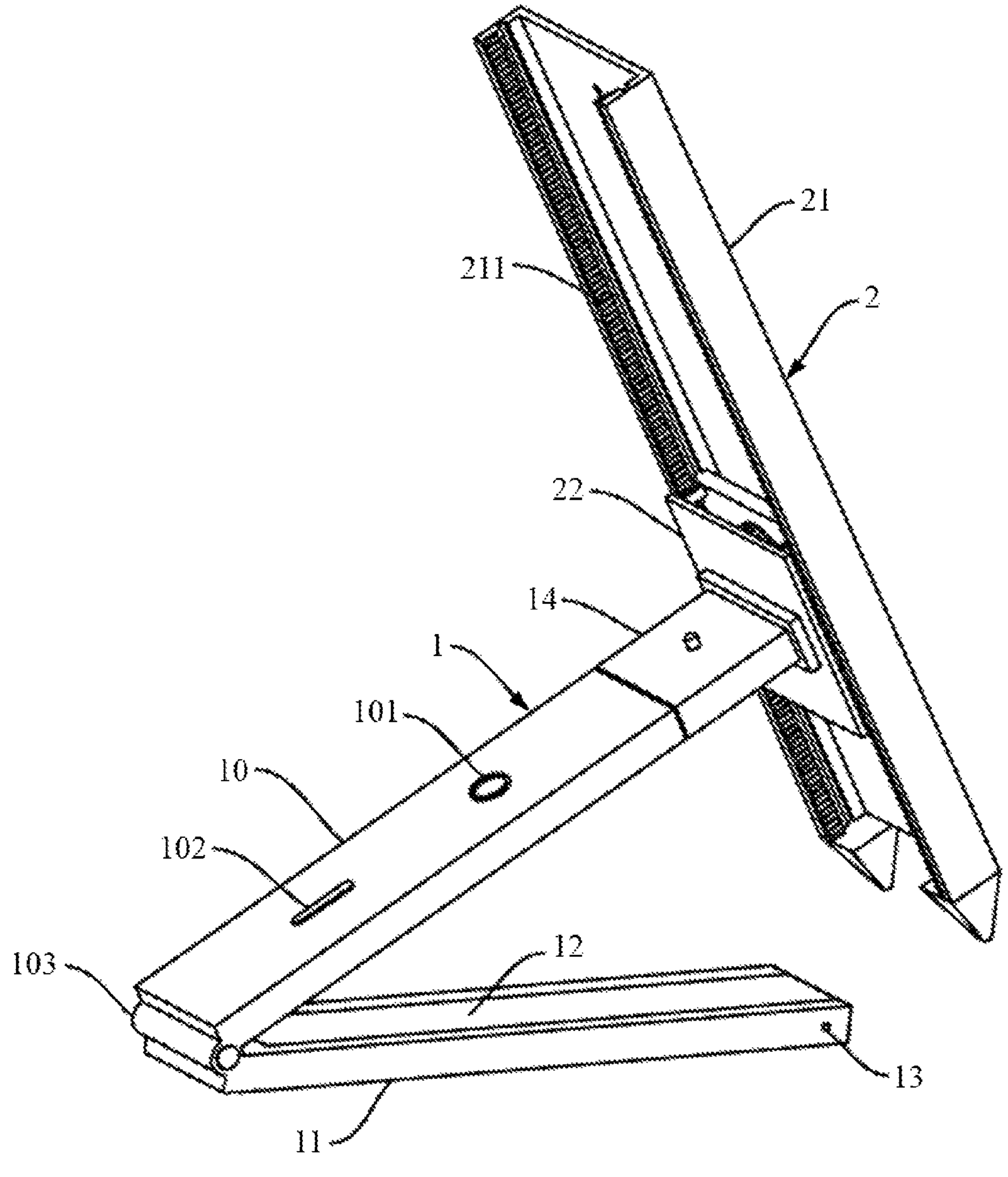
FIG. 1 is a schematic three-dimensional diagram of a vertical-height gauge.
Figure 2:
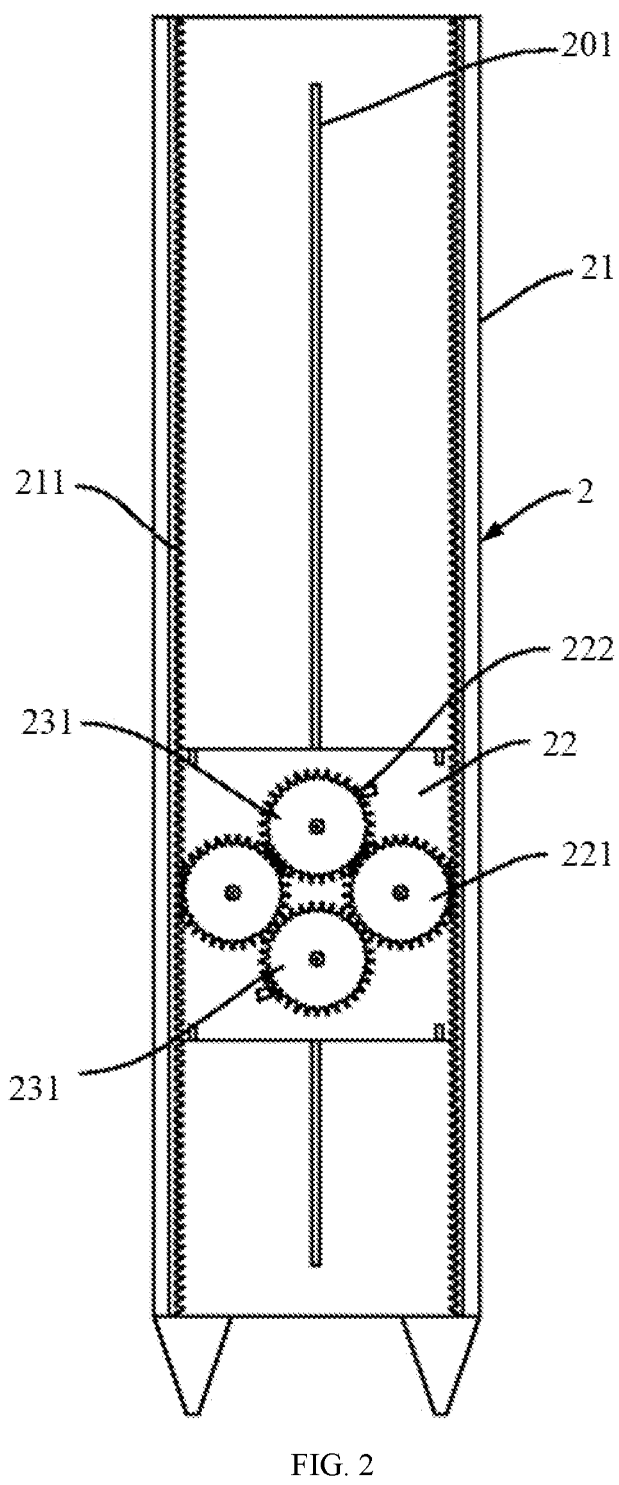
FIG. 2 is a schematic diagram of a combination state of a support fixing plate and a half-section slide plate.
Figure 3:
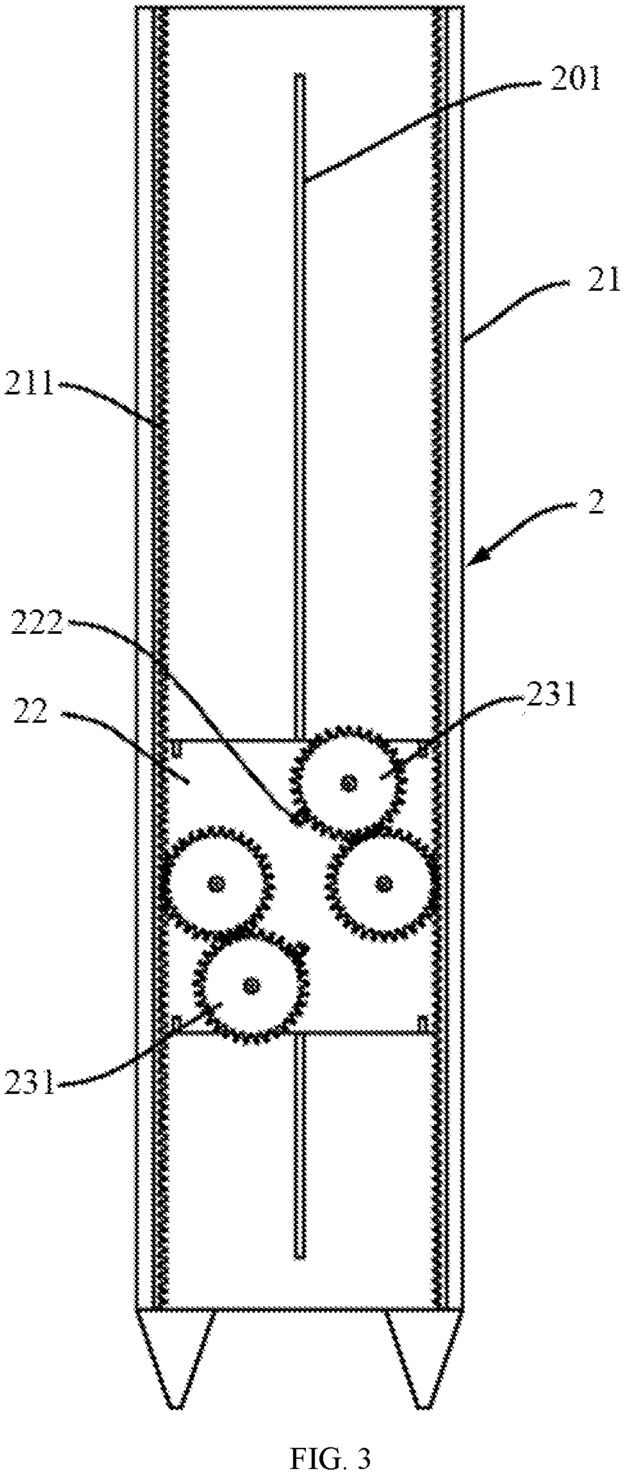
FIG. 3 is a schematic diagram of another combination state of a support fixing plate and a half-section slide plate.
Figure 4:
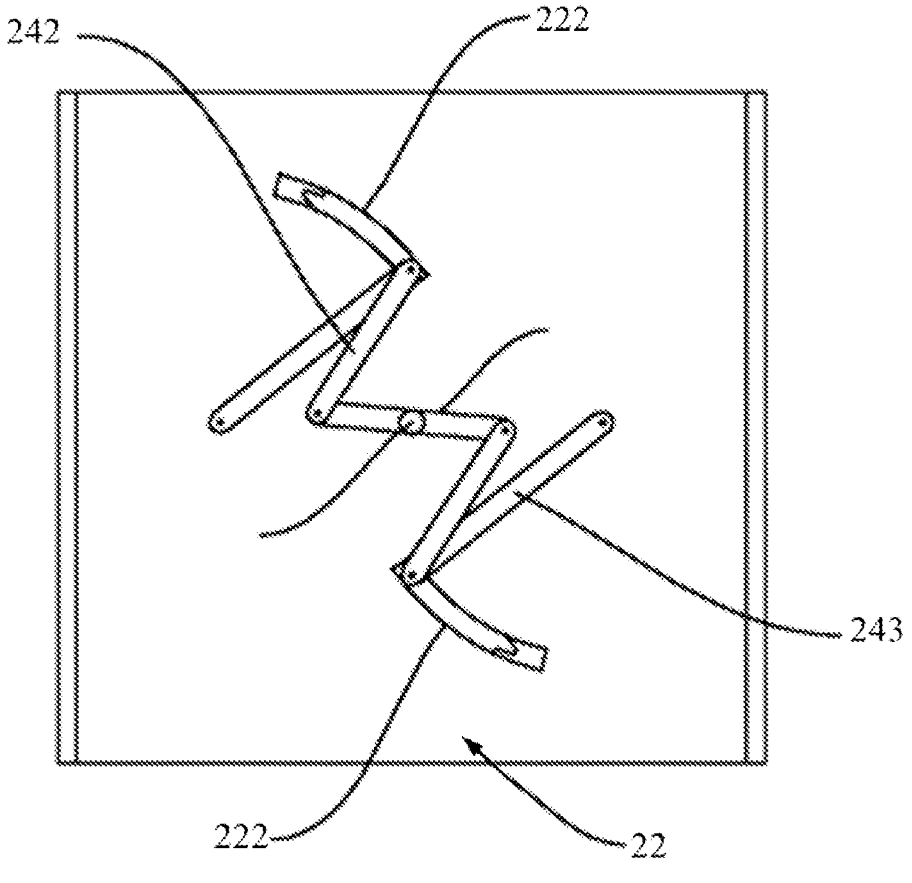
FIG. 4 is a schematic diagram of a back surface of a slide plate.
Figure 5:
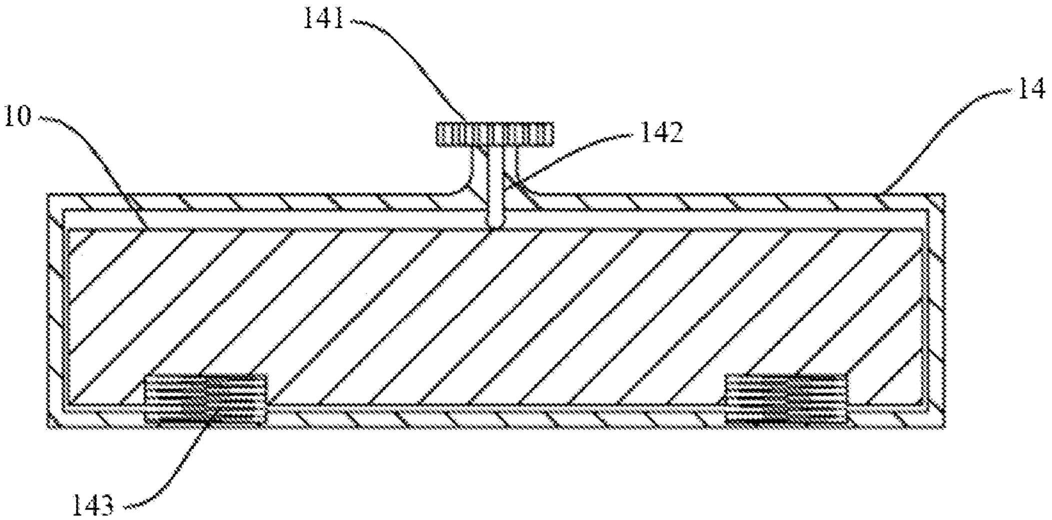
FIG. 5 is a schematic sectional view of a measuring plate fixing sleeve.

Reference numerals: measuring plate 1, reference plate 10, circular level 101, leveling tube 102, built-in hinge 103, auxiliary reference plate 11, reference ruler 12, reference ruler fixing screw 13, filling member 131, measuring plate fixing sleeve 14, lifting micro-screw 141, push pin 142, embedded spring 143, fixing plate 2, vertical slit 201, fixing base plate 21, rack 211, slide plate 22, first gear 221, brake groove 222, brake gear 231, first rotating rod 241, second rotating rod 242, third rotating rod 243, first rotating shaft 244, plumb 31, steel tape 32, and plumb rope 33.

DETAILED DESCRIPTION OF THE EMBODIMENTS

The technical solutions of the present disclosure are described in further detail below in conjunction with specific embodiments and accompanying drawings.

Embodiment 1

As shown in FIGS. 1, 2, 3, 4 and 5, a vertical-height gauge includes a measuring plate 1, a support fixing plate 2, a plumb 31, a steel tape 32 and a plumb rope 33. The measuring plate 1 includes a reference plate 10, an auxiliary reference plate 11 and a reference ruler 12.

The support fixing plate 2 includes a fixing base plate 21, two racks 211 are oppositely arranged on a side surface of the fixing base plate 21, a slide plate 22 is arranged between the two racks 211, a first gear 221 meshing with the single rack 211 and rotating is arranged on two sides of the slide plate 22 separately, a control assembly is arranged on the slide plate 22, and the control assembly is configured to control a rotating state of the first gears 221.

The slide plate 22 is slidable in a length direction of the fixing base plate 21, and the reference plate 10 is perpendicularly connected to the slide plate 22.

An upper surface of the reference plate 10 is provided with a circular level 101 and a leveling tube 102, the reference plate 10 and the auxiliary reference plate 11 are connected by a built-in hinge 103 at an end of the reference plate 10, the reference ruler 12 is built in the auxiliary reference plate 11, the reference ruler 12 has a trapezoidal cross section, reference ruler fixing screws 13 are symmetrically arrange on two sides of the auxiliary reference plate 11, and the reference ruler fixing screws 13 are configured to fix a position of the reference ruler 12.

A measuring plate fixing sleeve 14 sleeves an end of the reference plate 10 close to the slide plate 22, a lifting micro-screw 141 is arranged on an upper wall of the measuring plate fixing sleeve 14, the lifting micro-screw 141 is connected to a push pin 142, the push pin 142 makes contact with the upper surface of the reference plate 10, two embedded springs 143 are arranged in a lower wall of the measuring plate fixing sleeve 14 and make contact with the reference plate 10.

The reference plate 10 is perpendicularly connected to the slide plate 22 through the measuring plate fixing sleeve 14.

Figure 7:
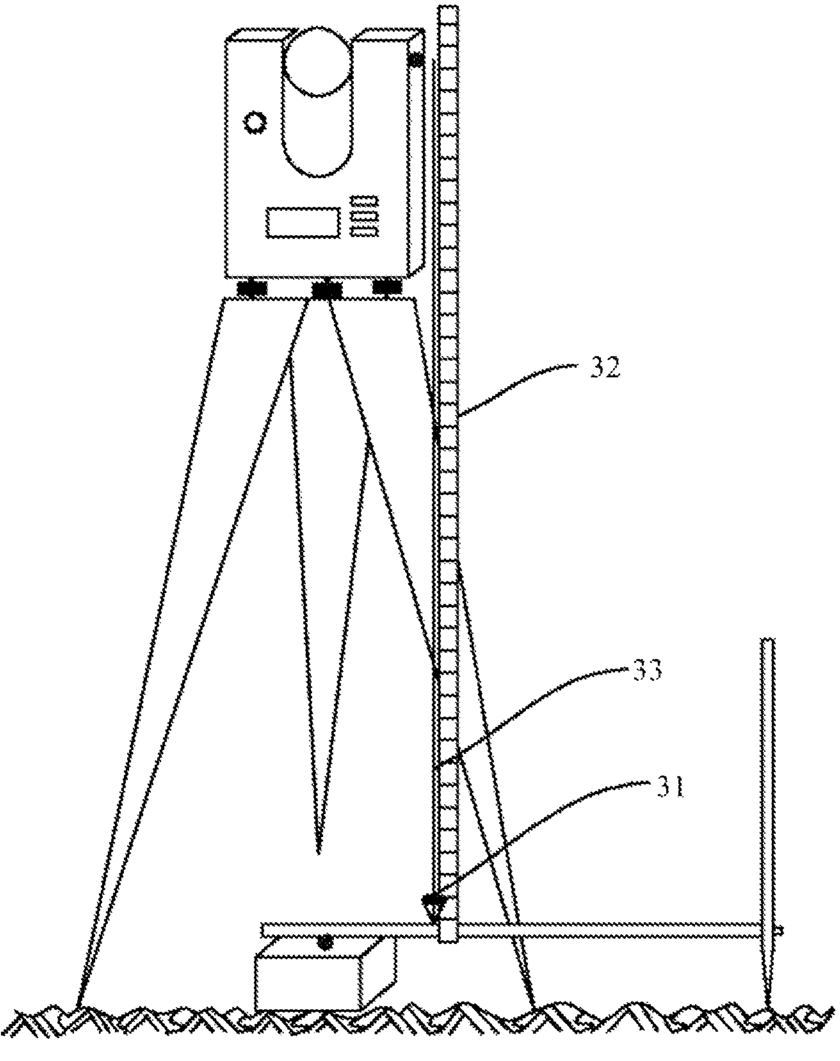
FIG. 7 is a schematic diagram of a measuring state of a vertical-height gauge.
Figure 8:
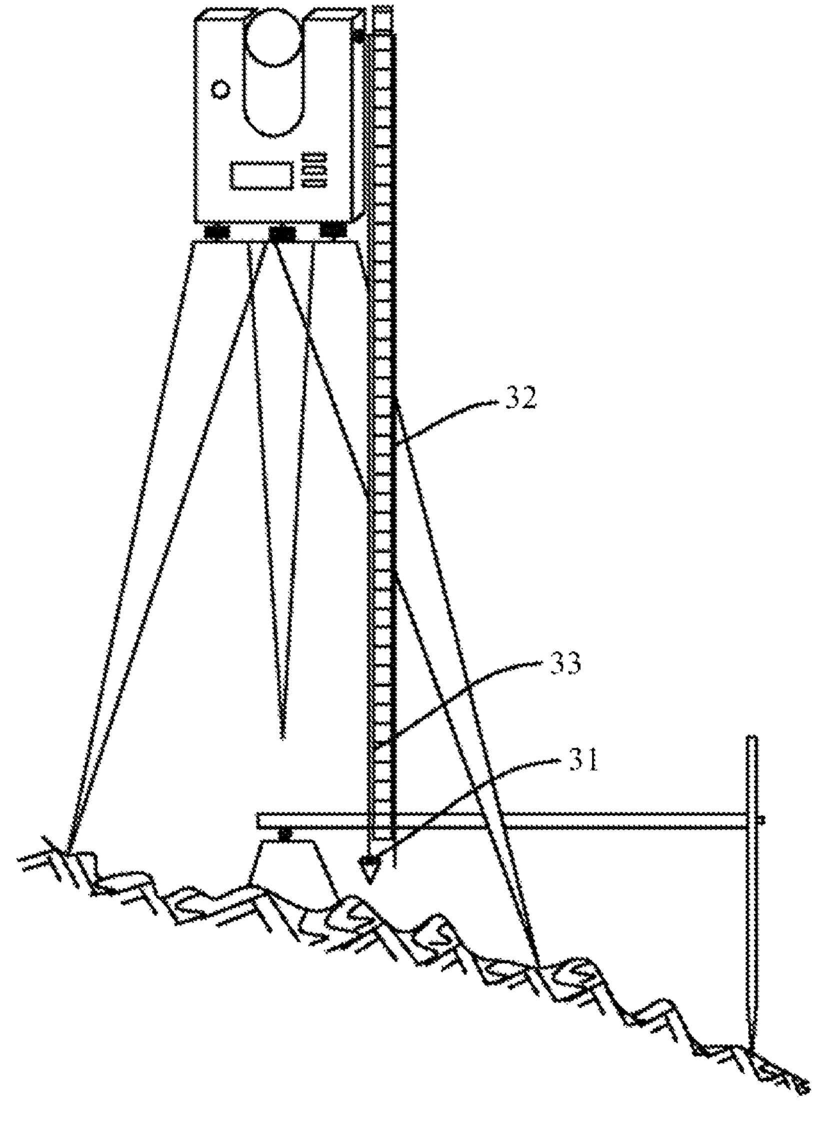
FIG. 8 is a schematic diagram of another measuring state of a vertical-height gauge.
Figure 9:
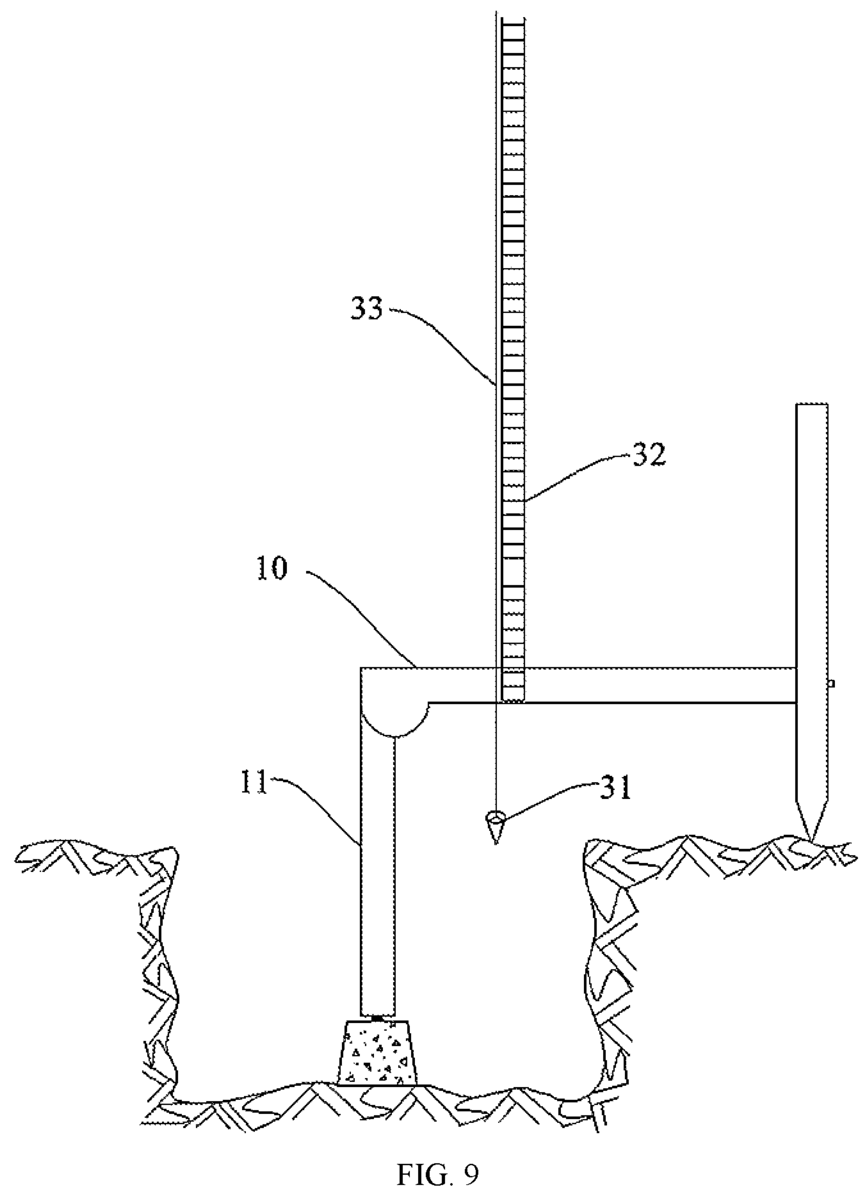
FIG. 9 is a schematic diagram of another measuring state of a vertical-height gauge.
Figure 10:
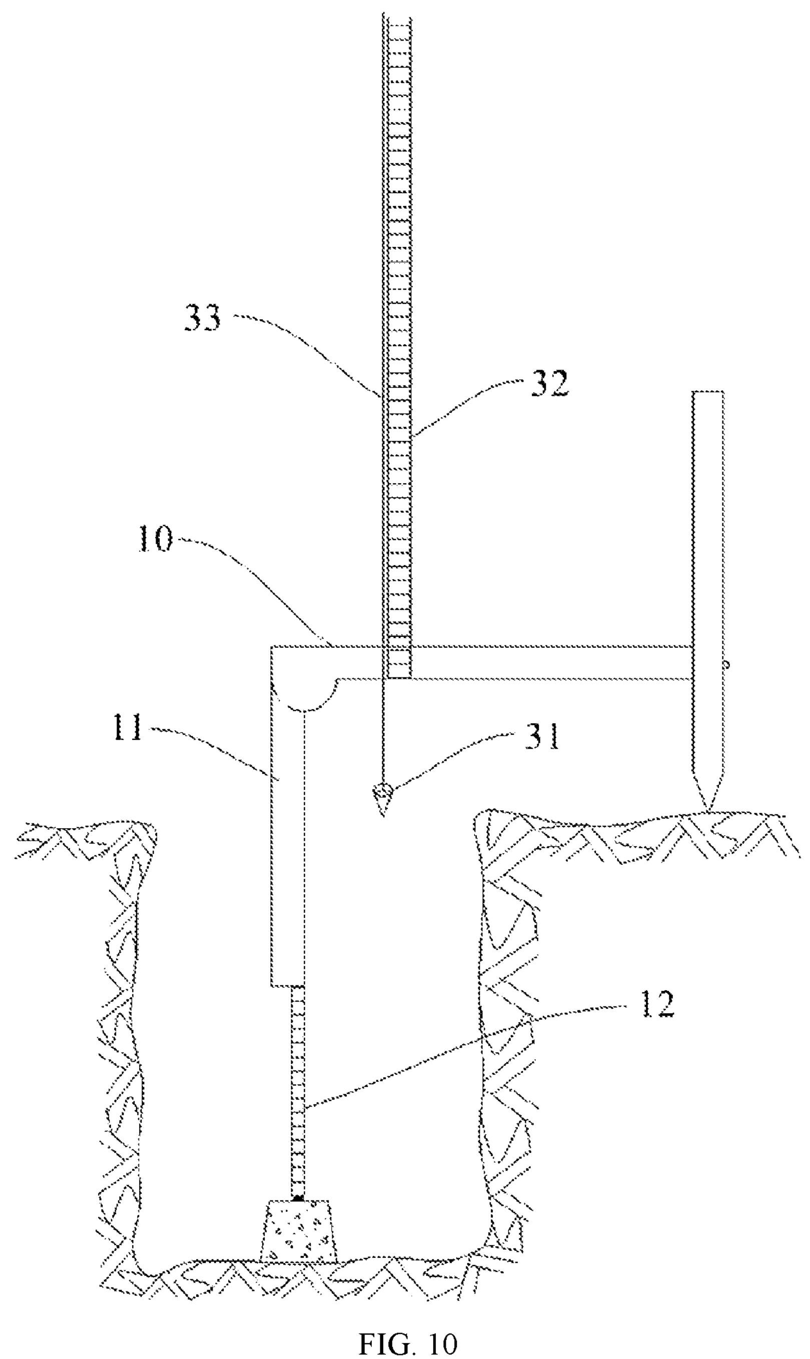
FIG. 10 is a schematic diagram of another measuring state of a vertical-height gauge.

According to the design of the entire device, the measuring plate 1 consists of the reference plate 10, the auxiliary reference plate 11 and the reference ruler 12. The reference plate 10, the auxiliary reference plate 11 and the reference ruler 12 are independent of each other and combined together. The entire device is simple and compact, and convenient to carry. Before measurement, the entire instrument is assembled first. According to a height of a measurement point from the ground, in case that the measurement point is high than a bottom end of the support fixing plate 2, as shown in FIGS. 7 and 8, the measuring plate 1 is placed in a horizontal position through a circular level with a bubble in the middle, a bottom surface of an end of the measuring plate away from the support fixing plate 2 is placed on the measurement point, the slide plate 22 connected to the other end is fixed through the control assembly, the lifting micro-screw 141 is adjusted to make the measuring plate 1 accurately horizontal, and a height is capable of being accurately measured by using the plumb 31 and the steel tape 32. As shown in FIG. 9, in case that the measurement point is lower than the bottom of the support fixing plate 2 or the measurement point is lower than the ground surface (h≤25 cm), the auxiliary reference plate 11 is used, the reference plate 10 is rotated clockwise to a position perpendicular to the measuring plate 1 by using a built-in hinge 103, one end of the auxiliary reference plate is placed on the measurement point, and the measuring plate 1 fixing screw is adjusted to center the bubble of the circular level, such that the height is capable of being measured, and other operation steps are the same as that when the measurement point is higher than the bottom end of the support fixing plate 2. As shown in FIG. 10, when the measurement point is lower than the ground surface (25 cm≤h≤50 cm), the reference ruler 12 needs to be used, first, the auxiliary reference plate is screwed down, the reference ruler fixing screw 13 is loosened, the reference ruler 12 is pulled out to a suitable position, then the reference ruler fixing screw 13 is screwed to fix the reference ruler 12, and other operation steps are the same as that when the measurement point is higher than the bottom end of the support fixing plate 2. The entire device is less influenced by external factors of a magnetic field and weather, and basically adapts to measurement for a measurement point under various conditions. The measurement is convenient and efficient, the accuracy is reliable, and an error is small. In case that center positions of horizontal axes of a theodolite and a total station, center positions of a prism and a beacon, a global position system (GPS) antenna position is capable of being provided accurately, measurement effects are better. Accuracy is capable of reaching 0.1 mm.

Through arrangement of the support fixing plate 2, the two first gears 221 on the slide plate 22 respectively mesh with the two racks 211 oppositely arranged on a side surface of the fixing base plate 21, such that the slide plate 22 is capable of being displaced in a horizontal direction of the fixing base plate 21. Through control over a rotation state of the first gears 221 by the control assembly, a position of the slide plate 22 on the fixing base plate 21 is further adjusted. Since the reference plate 10 is perpendicularly connected to the slide plate 22, the position of the reference plate is adjusted by controlling the slide plate 22. Through the above arrangement, in a process of adjusting the position of the slide plate, the slide plate 22 is capable of being controlled to be fixed at any position along the fixing base plate 21. Moreover, by using the gears, damping feeling is capable of being improved to accurately control the position, and accuracy of the entire device is improved. Through perpendicular arrangement of the support fixing plate 2 and the auxiliary reference plate 11, the device is capable of being applied to different terrains and effectively guarantees measurement accuracy. Moreover, through the perpendicular arrangement of the support fixing plate 2 and the auxiliary reference plate 11, a shaking problem caused by single plate support is capable of being avoided or solved. Moreover, levelness feedback and adjustment efficiency of the reference plate 10 is capable of being obviously improved after displacement of any plate.

Through arrangement of the measuring plate fixing sleeve 14, the lifting micro-screw 141 is connected to the push pin 142, a certain gap is formed between the measuring plate fixing sleeve 14 and the measuring plate 1, and the push pin 142 is driven to move up and down through rotation of the lifting micro-screw 141, such that the measuring plate 1 is finely adjusted, and the horizontal accuracy of the measuring plate 1 is ensured. Two embedded springs 143 are arranged in the lower wall of the measuring plate fixing sleeve 14 and make contact with the reference plate 10. On one hand, a certain gap is capable of being kept between the measuring plate fixing sleeve and the measuring plate, more friction or scratch is capable of being prevented from being generated between the measuring plate fixing sleeve 14 and the measuring plate 1, accuracy of the entire instrument in a use process are capable of being improved, and the adjustment of the measuring plate by the lifting micro-screw 141 is facilitated. On the other hand, the springs 143 effectively absorb tiny vibration or impact generated by the measuring plate 1 in a use process, and reduce an influence, such as small vibration caused by airflow flowing through the measuring plate, of a surrounding environment on measurement.

Further, a mounting plate is arranged at an interval on a side of the slide plate 22 where the first gear 221 is arranged. The mounting plate is configured to protect the first gear 221 and the control assembly, and the mounting plate is configured to be connected to the reference plate 10. Further, the mounting plate on the slide plate 22 is configured to be perpendicularly connected to the measuring plate fixing sleeve 14.

Further, the lower end of the support fixing plate 2 is provided with a plurality of conical sharp corners. Providing the lower end of the support fixing plate 2 with the plurality of conical sharp corners is beneficial to insertion of the support fixing plate 2 into soil, and is capable of improving stability of the support fixing plate 2, reduce or prevent deviation of the support fixing plate 2 caused by improper operation or external force factors in a measurement process, and improve accuracy of experimental data.

Further, the entire device material is made of stainless steel. The use of stainless steel is capable of improving the service life of the entire device, and also preventing or reducing wear or loss of parts in a use process.

The control assembly includes brake gears 231 arranged corresponding to the first gear 221, the brake gears 231 limits rotation of the first gears 221 by meshing with the two first gears 221, the brake gear 231 is connected to a switch assembly, the switch assembly is configured to rotate the brake gear 231 around a rotation shaft of one first gear 221 when the brake gear maintains a meshing state with the first gear 221, and to move the brake gear 231 closer to or away from the other first gear 221.

The switch assembly is arranged on the slide plate 22.

The brake gear 231 limits rotation of the first gears 221 by meshing with the two first gears 221, that is, a self-locking state is formed. A brake effect of the slide plate 22 is capable of being guaranteed by arranging the brake gear 231, and stability and accuracy of the entire device are improved. Moreover, the switch assembly is configured to rotate the brake gear 231 around a rotation shaft of one first gear 221 when the brake gear maintains a meshing state with the first gear 221, that is, the brake gear 231 meshes with one first gear 221 all the time. Moreover, the switch assembly is configured to rotate an axis of the brake gear 231 around an axis of the first gear 221, such that the brake gear 231 mores away from or close to the other first gear 221, thereby sliding or fixing the slide plate 22. Further, the arrangement of the brake gear 231 is capable of improving rotation resistance of the first gear 221, and the resistance is capable of improving the accuracy of the first gear 221 in a rotation process, such that the accuracy of the entire device is capable of being improved.

The brake gear 231 is identical to the first gear 221.

The brake gear 231 is identical to the first gear 221, such that no matter what state the first gear 221 is in, the switch assembly controls the brake gear 231 to mesh with two adjacent first gears 221, that is, no matter what position of the fixing base plate 21 the slide plate 22 is in, braking of the slide plate 22 is capable of being guaranteed.

The slide plate 22 is provided with a brake groove 222, the brake gear 231 is slidably arranged in the brake groove 222, and the brake groove 222 is configured to define a movement path of the brake gear 231.

The brake groove 222 arranged on the slide plate 22 guarantees that the brake gear 231 moves according to a specified route, and also prevents the brake gear 231 from being separated from a normal position, and stability of operation of the brake gear 231 is capable of being guaranteed.

The switch assembly includes a first rotating rod 241, an end of the first rotating rod 241 is hinged to an end of a second rotating rod 242, the other end of the second rotating rod 242 is hinged to an end of a third rotating rod 243, the other end of the third rotating rod 243 is rotatably connected to the rotation shaft of the first gear 221, a gear shaft of the brake gear 231 is rotatably connected to the third rotating rod 243.

A first rotating shaft 244 is perpendicularly arranged in the middle of the first rotating rod 241, and the first rotating shaft 244 is configured to control the first rotating rod 241 to rotate around the first rotating shaft 244.

A vertical slit 201 is formed on the support fixing plate 2, and the first rotating shaft 244 perpendicularly passes through the vertical slit 201.

Through arrangement of the switch assembly, rotation of the first rotating rod 241 is capable of driving the third rotating rods 243 at two ends to rotate in opposite directions around the rotation shafts of the first gears 221 respectively connected through hinge between the first rotating rod 241, the second rotating rod 242 and the third rotating rods 243. The rotation of the first rotating rod 241 is driven through the first rotating shaft 244, and the first rotating shaft 244 also perpendicularly passes through the vertical slit 201, such that an operator is capable of directly controlling the first rotating shaft 244 to control the brake gear 231 to get close to or separate from another first gear 221, that is, controls the first rotating shaft 244 to control the slide plate 22. Through arrangement of the switch assembly, the entire operation is simple and easy. The switch assembly is capable of being operated with one hand, and moreover, one-handed operation is capable of improving the entire accuracy.

A filling member 131 is arranged at an end of the reference ruler fixing screw 13, the filling member 131 is hollow, and a surface of the filling member 131 is rough.

Through arrangement of the filling member 131, the filling member 131 is made of a flexible substance, such that excessive friction or scratches between the reference ruler fixing screw 13 and a side surface of the reference ruler 12 is capable of being prevented, and problems such as sliding and blocking between the reference ruler 12 and a base floating plate caused by scratches and burrs are capable of being avoided. Further, when the filling member 131 is pressed, a surface area is capable of being increased, a friction force on the reference ruler 12 is capable of being improved, and retraction of the reference ruler 12 or other conditions are capable of being prevented.

The Present Disclosure Further Provides a Vertical-Height Measuring Method, Including:

S1: assemble a vertical-height gauge;

S2: keep a measuring plate 1 approximately horizontal, and fix a position of a slide plate 22 with the other hand through a control assembly;

S3: adjust the measuring plate 1, and make the measuring plate 1 horizontal accurately;

S4: fix an end of a steel tape 32 to a lower edge of the measuring plate 1, and put the steel tape 32 into any narrow groove of a plumb 31 to tightly attach a plumb rope 33, so as to guarantee vertical measurement, or tightly attach the plumb rope 33 for direct measurement;

S5: complete measurement according to S2-S4 in case that a measurement point is higher than a height of the ground; and S6: in case that the measurement point is lower than the ground, screw an auxiliary reference plate 11 down according to the depth or pulling a reference ruler 12, and complete the measurement according to S2-S4.

Embodiment 2

Embodiment 2 shows another vertical-height gauge of the present disclosure, and differs from Embodiment 1 in that:

an inner groove or out convex point is arranged on a side surface of the reference ruler 12. Through arrangement of the reference ruler 12, the inner groove or the outer convex point is configured to increase a contact area with an end of the reference ruler fixing screw 13, and damage to a ruler body is reduced by using the inner groove or the outer convex point.

Embodiment 3

Figure 6:
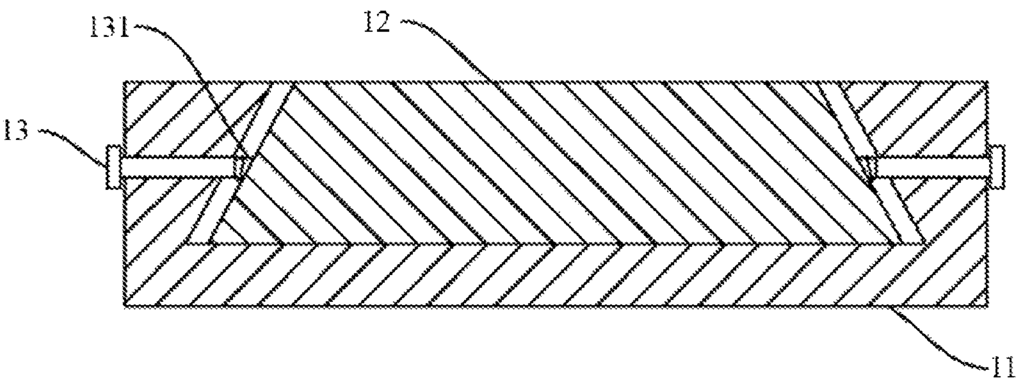
FIG. 6 is a schematic sectional view diagram of an auxiliary reference plate.

FIG. 6 schematically shows another vertical-height gauge according to the present disclosure, and differs from Embodiment 1 in that:

the filling member 131 is hollow, a bending member is arranged in the middle of the filling member 131, and the filling member 131 and the reference ruler 12 are provided with openings at open ends. The hollow filling member 131 has a larger contact area after being pressed, which is more conducive to protection of the ruler body. Moreover, the opening arrangement generates a suction force on a side of the ruler body after the filling member is pressed, which is conducive to stability of the reference ruler 12. The above structure effectively guarantees that a position of the reference ruler 12 is fixed relative to the auxiliary reference plate 11, and the problem that the reference ruler 12 is damaged since contact stress of the reference ruler 12 fixing screw 13 is too concentrated relative to the reference ruler 12. Stress points are dispersed by the filling member 131.

The technical solutions of the present disclosure are described in detail in the above embodiments. It should be understood that the above descriptions are merely specific embodiments of the present disclosure, but are not intended to limit the present disclosure. Any modification, supplement, or similar modes made within the principle scope of the present disclosure should fall within the protection scope of the present disclosure.

What is claimed is:

1. A vertical-height gauge, comprising a measuring plate (1), a support fixing plate (2), a plumb (31), a steel tape (32) and a plumb rope (33), wherein the measuring plate (1) comprises a reference plate (10), an auxiliary reference plate (11) and a reference ruler (12);

the support fixing plate (2) comprises a fixing base plate (21), two racks (211) are oppositely arranged on a side surface of the fixing base plate (21), a slide plate (22) is arranged between the two racks (211), first gears (221) meshing with the two racks (211) are arranged on two sides of the slide plate (22) respectively, a control assembly is arranged on the slide plate (22), and the control assembly is configured to control a rotating state of the first gears (221); and and the slide plate (22) is slidable in a length direction of the fixing base plate (21), and the reference plate (10) is perpendicularly connected to the slide plate (22).

2. The vertical-height gauge according to claim 1, wherein the control assembly comprises brake gears (231) arranged corresponding to the first gears (221), each of the brake gears (231) limits rotation of the first gears (221) by meshing with the first gears (221), the brake gears (231) are connected to a switch assembly, the switch assembly is configured to rotate each of the brake gears (231) around a rotation shaft of a corresponding one of the first gears (221) when each of the brake gears (231) maintains a meshing state with the corresponding one of the first gears (221), and to move each of the brake gears (231) closer to or away from the other one of the first gears (221); and the switch assembly is arranged on the slide plate (22).

3. The vertical-height gauge according to claim 2, wherein the brake gears (231) are identical to the first gears (221).

4. The vertical-height gauge according to claim 2, wherein the slide plate (22) is provided with brake grooves (222), the brake gears (231) are slidably arranged in the brake grooves (222) respectively, and the brake grooves (222) are configured to define movement paths of the brake gears (231) respectively.

5. The vertical-height gauge according to claim 4, wherein the switch assembly comprises a first rotating rod (241), two second rotating rods and two third rotating rods;

two ends of the first rotating rod (241) are hinged to one end of the two second rotating rods (242) respectively, the other end of each of the two second rotating rods (242) is hinged to an end of a corresponding one of the two third rotating rods (243), the other end of each of the two third rotating rods (243) is rotatably connected to the rotation shaft of the corresponding one of the first gears (221), a gear shaft of each of the brake gears (231) is rotatably connected to the corresponding one of the two third rotating rods (243);

a first rotating shaft (244) is perpendicularly arranged in the middle of the first rotating rod (241), and the first rotating shaft (244) is configured to control the first rotating rod (241) to rotate around the first rotating shaft (244); and a vertical slit (201) is formed on the support fixing plate (2), and the first rotating shaft (244) perpendicularly passes through the vertical slit (201).

6. The vertical-height gauge according to claim 1, wherein an upper surface of the reference plate (10) is provided with a circular level (101) and a leveling tube (102), the reference plate (10) and the auxiliary reference plate (11) are connected by a built-in hinge (103) at an end of the reference plate (10), the reference ruler (12) is built in the auxiliary reference plate (11), the reference ruler (12) has a trapezoidal cross section, reference ruler fixing screws (13) are symmetrically arrange on two sides of the auxiliary reference plate (11), and the reference ruler fixing screws (13) are configured to fix a position of the reference ruler (12).

7. The vertical-height gauge according to claim 6, wherein a measuring plate fixing sleeve (14) sleeves an end of the reference plate (10) close to the slide plate (22), a lifting micro-screw (141) is arranged on an upper wall of the measuring plate fixing sleeve (14), the lifting micro-screw (141) is connected to a push pin (142), the push pin (142) makes contact with the upper surface of the reference plate (10), two embedded springs (143) are arranged in a lower wall of the measuring plate fixing sleeve (14) and make contact with the reference plate (10); and the reference plate (10) is perpendicularly connected to the slide plate (22) through the measuring plate fixing sleeve (14).

8. The vertical-height gauge according to claim 6, wherein a filling member (131) is arranged at an end of the reference ruler fixing screw (13), the filling member (131) is hollow, and a surface of the filling member (131) is rough.

9. A vertical-height measuring method, using the vertical-height gauge according to claim 1, and comprising:

S1: assembling the vertical-height gauge;

S2: keeping the measuring plate (1) approximately horizontal, and fixing a position of the slide plate (22) with the other hand through the control assembly;

S3: adjusting the measuring plate (1), and making the measuring plate (1) horizontal accurately;

S4: fixing an end of the steel tape (32) to a lower edge of the measuring plate (1), and putting the steel tape (32) into any narrow groove of the plumb (31) to tightly attach the plumb rope (33), so as to guarantee vertical measurement, or tightly attach the plumb rope (33) for direct measurement;

S5: completing measurement according to S2-S4 in case that a measurement point is higher than a height of the ground; and S6: in case that the measurement point is lower than the ground, screwing the auxiliary reference plate (11) down according to the depth or pulling the reference ruler (12), and completing the measurement according to S2-S4.

* * * * *